United States Patent
Lee et al.

(10) Patent No.: US 9,813,098 B2
(45) Date of Patent: Nov. 7, 2017

(54) MOBILE TERMINAL

(71) Applicant: LG ELECTRONICS INC., Seoul (KR)

(72) Inventors: Jinhwan Lee, Seoul (KR); Junmin Choi, Seoul (KR); Daewoong Jon, Seoul (KR); Junhong Kang, Seoul (KR); Youngil Lee, Seoul (KR); Wooseok Lee, Seoul (KR); Mangeun Yoon, Seoul (KR); Taeki Um, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/072,081

(22) Filed: Mar. 16, 2016

(65) Prior Publication Data

US 2017/0070254 A1  Mar. 9, 2017

(30) Foreign Application Priority Data

Sep. 4, 2015 (KR) .................. 10-2015-0125699

(51) Int. Cl.
| | |
|---|---|
| H04M 1/00 | (2006.01) |
| H04B 1/3888 | (2015.01) |
| G06F 1/16 | (2006.01) |
| H04M 1/02 | (2006.01) |

(52) U.S. Cl.
CPC ......... *H04B 1/3888* (2013.01); *G06F 1/1626* (2013.01); *G06F 1/1656* (2013.01); *H04M 1/0249* (2013.01); *H04M 1/0252* (2013.01)

(58) Field of Classification Search
CPC ... H04B 1/3888; G06F 1/1626; G06F 1/1656; H04M 1/0249; H04M 1/0252

USPC .................. 455/575.4, 575.8, 575.1, 550.1
See application file for complete search history.

(56) References Cited

U.S. PATENT DOCUMENTS

| | | | | |
|---|---|---|---|---|
| 7,529,571 B2 * | 5/2009 | Byun | .................. | H04M 1/0237 16/334 |
| 8,077,450 B2 * | 12/2011 | Shen | ..................... | G06F 1/1624 361/679.3 |
| 2007/0032278 A1 * | 2/2007 | Lee | ..................... | H04M 1/0247 455/575.4 |
| 2008/0093208 A1 * | 4/2008 | Seo | ........................ | G06F 3/0338 200/406 |
| 2010/0127515 A1 * | 5/2010 | Wu | ..................... | H04M 1/0237 292/303 |

(Continued)

FOREIGN PATENT DOCUMENTS

| | | |
|---|---|---|
| EP | 2498479 A1 | 9/2012 |
| EP | 2680546 A1 | 1/2014 |

*Primary Examiner* — Khai M Nguyen
(74) *Attorney, Agent, or Firm* — Dentons US LLP

(57) ABSTRACT

There is disclosed a mobile terminal including a body, a first case coupled to the body and covering a first lateral surface of the body, a second lateral surface facing the first lateral surface and a rear surface of the body, a first slide groove formed in one or more of the first and second lateral surfaces of the body, a second slide groove formed in an inner surface of the first case and facing the first slide groove, and a slide bar inserted in a slide hole formed by the first slide groove and the second slide groove, so that according to at least one of the embodiments mentioned above, the coupling structure more stable than the conventional hook structure may be provided and it may be easy to assemble and dissemble the mobile terminal.

17 Claims, 9 Drawing Sheets

(56) References Cited

U.S. PATENT DOCUMENTS

2011/0076091 A1 3/2011 Jenks
2014/0334077 A1 11/2014 Kwong

* cited by examiner

MOBILE TERMINAL

CROSS-REFERENCE TO RELATED APPLICATIONS

This application claims priority to Korean Patent Application No. 10-2015-0125699 filed on Sep. 4, 2015 in Korea, the entire contents of which is hereby incorporated by reference in its entirety.

BACKGROUND OF THE DISCLOSURE

Field of the Disclosure

Embodiments of the present disclosure relate to a mobile terminal including a structure for enhancing a coupling force between a rear case and a body.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions of the mobile terminals become more diversified, the mobile terminals are used more frequently and more micro-sized. Such micro-sizing gives restriction to the coupling structure of the mobile terminal and it is getting difficult to realize such the coupling structure which eases the assembling or dissembling process, without separation in use.

SUMMARY OF THE DISCLOSURE

An object of the present disclosure is to provide a mobile terminal which may prevent the problems mentioned above and which includes a structure for enhancing a coupling force between a rear case and a body.

Embodiments of the present disclosure may provide a mobile terminal including a body; a first case coupled to the body and covering a first lateral surface of the body, a second lateral surface opposite side of the first lateral surface and a rear surface of the body; a first slide groove formed in one or more of the first and second lateral surfaces of the body; a second slide groove formed in an inner surface of the first case and facing the first slide groove; and a slide bar inserted in a slide hole formed by the first slide groove and the second slide groove.

The mobile terminal may further include a second case covering a third lateral surface adjacent to the first or second lateral surface of the body and a predetermined portion possessed by each of the first and second lateral surfaces, wherein the slide hole is extended to the second case.

The slide bar may include a fastening portion bend to a fourth lateral surface adjacent to the first or second lateral surface of the body; and a screw fastened to the body, penetrating the fastening portion.

The mobile terminal may further include a third case covering the fourth lateral surface, wherein the screw is fastened to the body, penetrating the penetrating portion and the third case.

The third case may include a polymer material and comprises an antenna pattern formed in the third case to contact a connection terminal provided in the body.

The mobile terminal may further include a spiral groove formed in the slide groove; and a screw thread formed in an outer surface of the slide bar and having a shape corresponding to the spiral groove, and the slide bar is inserted in the slide groove or drawn out of the slide groove, when rotating the slide bar.

The mobile terminal may further include saw-teeth formed in a longitudinal direction of the slide bar in succession, wherein the slide bar is retractable, using a rotation force of a pinon gear engaging with the saw-teeth.

The slide bar may include POM (Poly Oxy Methylene).

The slide bar may have one end provided outside the slide groove and a groove is formed in the slide bar.

The slide groove may be formed in the second lateral surface of the body and include a hook groove formed in the first lateral surface of the body; and a hook projected from the inside of the first lateral surface of the first case and coupled to the hook groove.

The first case may include a metallic material.

Embodiments of the present disclosure may also provide a mobile terminal including a body; a first case coupled to the body and covering a first lateral surface of the body, a second lateral surface facing the first lateral surface and a rear surface of the body; a hook groove formed in the first lateral surface of the body; a hook projected from an inside of a first lateral surface of the first case and hooked to the hook groove; a first slide groove formed in the second lateral surface of the body; a second slide groove formed in an inner surface of the first case and facing the first slide groove; and a slide bar inserted in a slide hole formed by the first slide groove and the second slide groove.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1A:
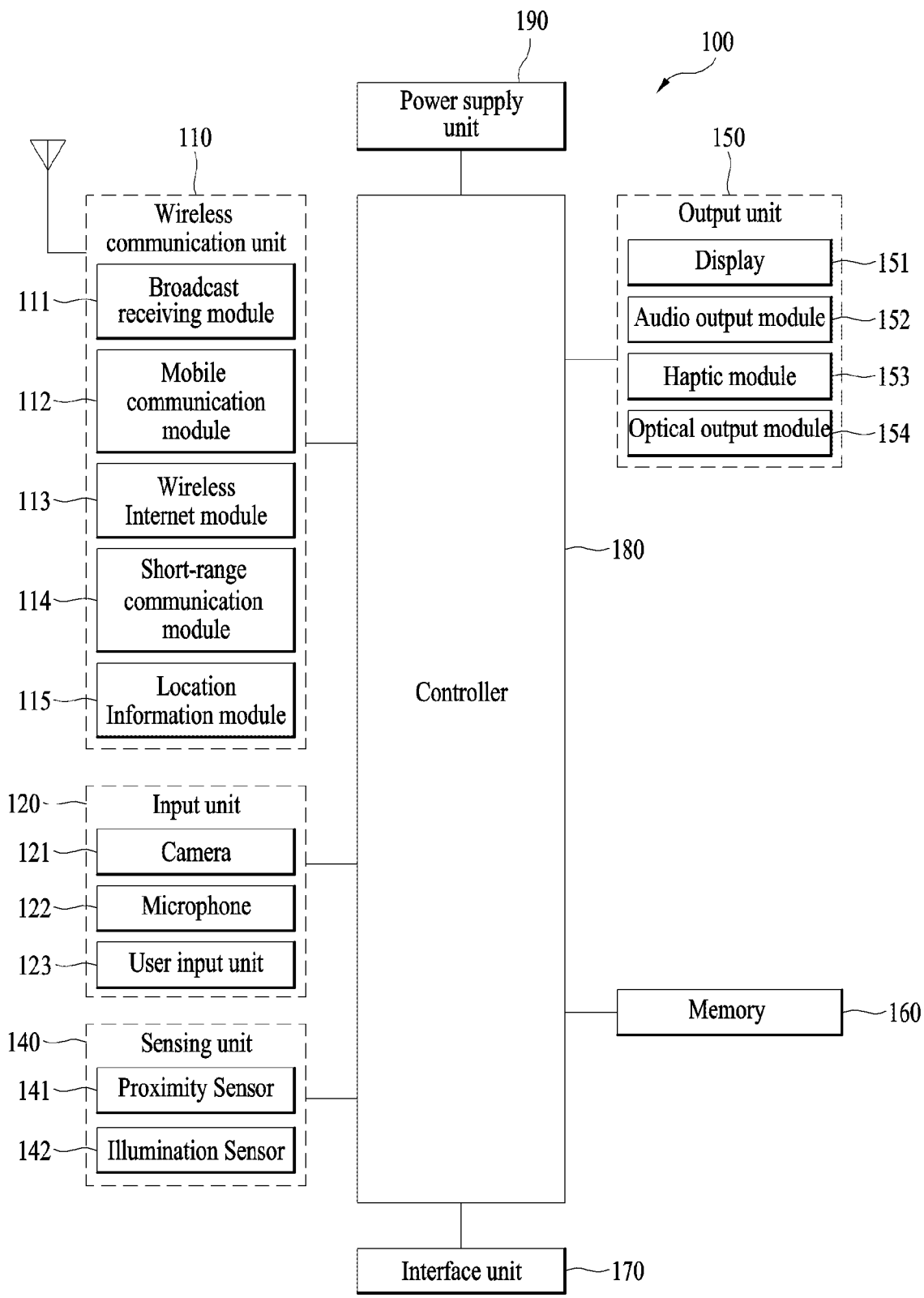
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
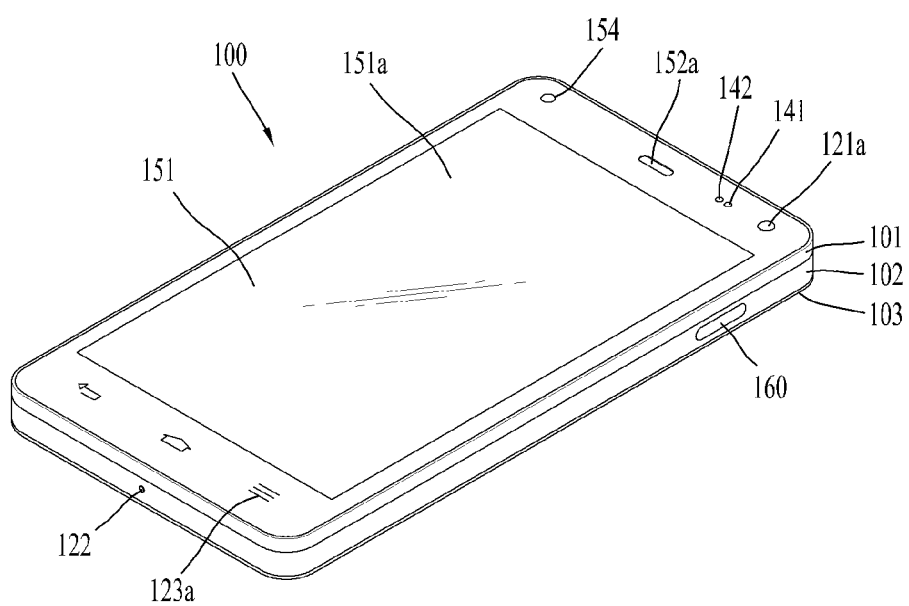
FIGS. 1B and 1C are conceptual views of one example of the mobile terminal, viewed from different directions.
Figure 1C:
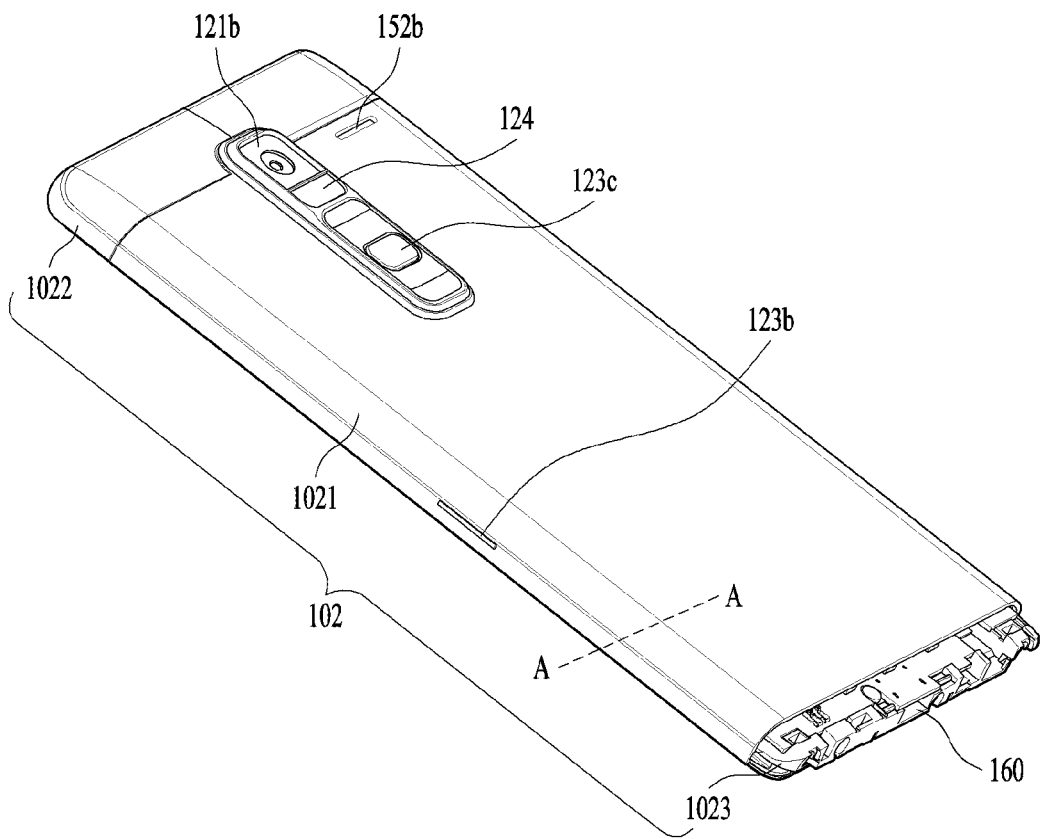

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover is shown covering the electronic components, and this cover may be detachably coupled to the rear case 102. Therefore, when the rear cover is detached from the rear case 102, the electronic components mounted to the rear case 102 are externally exposed.

As illustrated, when the rear cover is coupled to the rear case 102, a side surface of the rear case 102 is partially exposed. In some cases, upon the coupling, the rear case 102 may also be completely shielded by the rear cover. In some embodiments, the rear cover may include an opening for externally exposing a camera 121b or an audio output module 152b.

The cases 101, 102 may be formed by injection-molding synthetic resin or may be formed of a metal, for example, stainless steel (STS), aluminum (Al), titanium (Ti), or the like.

The cases 101 and 102 may be formed of the plurality of the pieces divided into two different materials-made pieces. Especially, many cases using metallic materials are released for exterior design and a non-conductive material may be partially used for antenna functions.

Such different materials-made pieces are fabricated separately and bonded or coupled by adhesives or a coupling structure or fabricated by double-injection molding. The double-injection molding has an advantage of an improved coupling force between the cases formed of the different materials-made pieces and also a disadvantage of unclean border area between the different materials-made pieces. Accordingly, it is not appropriate to apply such the different materials-made pieces to the cases 101, 102 and 103 exposed outside.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover, to hermetically seal an inner space when those cases are coupled.

FIGS. 1B and 1C depict certain components as arranged on the mobile terminal. On a front surface of the terminal body are arranged a display unit 151, a first audio output module 152a, a proximity sensor 141, an illumination sensor 142, an optical output unit 154, a first camera 121a and a first manipulation unit 123a. On a lateral surface of the terminal body are arranged a second manipulation unit 123b, a microphone 122 and an interface unit 160. On a rear surface of the terminal body are arranged a second audio output module 152b and a second camera 121. The mobile terminal 100 having such components arranged therein will be one example of the present disclosure.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the front case 101 of the mobile terminal in accordance with the present disclosure, such diverse components as the display unit, the printed circuit unit 185, the battery, the camera, the audio output module, the interface units and the like are mounted (hereinafter, the front case 101 having the diverse components mounted therein is referred to as "the body 200"). Hence, the rear case 101 is coupled to the front case (i.e., the body 200) to assemble the mobile terminal. Especially, the rear case 102 of the battery-integrated type mobile terminal is exposed outside so that it may be preferred to minimize the exposed coupling structure in the battery integrated type mobile terminal.

As a main example of the method for coupling the rear case 102 to the body 200, a hook and a screw are used. The hook is projected toward the inside of the rear case 192 and secured to a hook groove 1017 formed in the body 200. Generally, a plurality of hooks may be arranged along an edge area of the rear case 102.

In the coupling method using such the hook, the rear case 102 is widened by the force applied to the rear case 102 and the hook is inserted in the hook groove by the force. Such the coupling method relies on the elasticity of the rear case 102. If the hook is formed too large, it is difficult in the coupling method to couple the rear case to the body 200. Accordingly, the size of the projected portion of the hook is 0.4 mm and the coupling method of the rear case 102 to the body 200 using the hook has a disadvantage of a weak coupling force.

To enforce the coupling force, a screw may be used and a head of the screw is exposed outside. The least number of the screws has to be used and balance with the exterior design of the mobile terminal has to be considered, when using such the screws. In this instance, if the number of the screws is reduced, the portion spaced apart from the coupling portion 1045 can be widened disadvantageously.

The two methods mentioned above have the advantages and disadvantages, respectively. The present disclosure proposes a method for coupling the rear case 102 to the body 200 which can minimize the effect on the exterior design and improve the coupling force.

The rear case 102 of the mobile terminal in accordance with the present disclosure consists of three pieces 102. The rear case 102 includes a first case 1021 coupled to the body 200 and configured to cover a first lateral surface of the body 200, a second lateral surface facing the first lateral surface and a rear surface of the body 200; a second case 1022 configured to cover a first lateral surface adjacent to the first lateral surface or the second lateral surface of the body 200 and a predetermined portion possessed by each of the first and second lateral surfaces; and a third case configured to cover a fourth lateral surface facing the third lateral surface.

In this embodiment, the first lateral surface and the second lateral surface are left and right lateral surfaces. The third lateral surface is an upper lateral surface and the fourth lateral surface is a lower lateral surface. However, up, down, left and right of the fourth lateral surfaces can be reversed. A metallic material is used for the first case and a polymer material is used for the second case 1022 and the third case, so that the rear case 102 formed of the two different materials.

Figure 2:
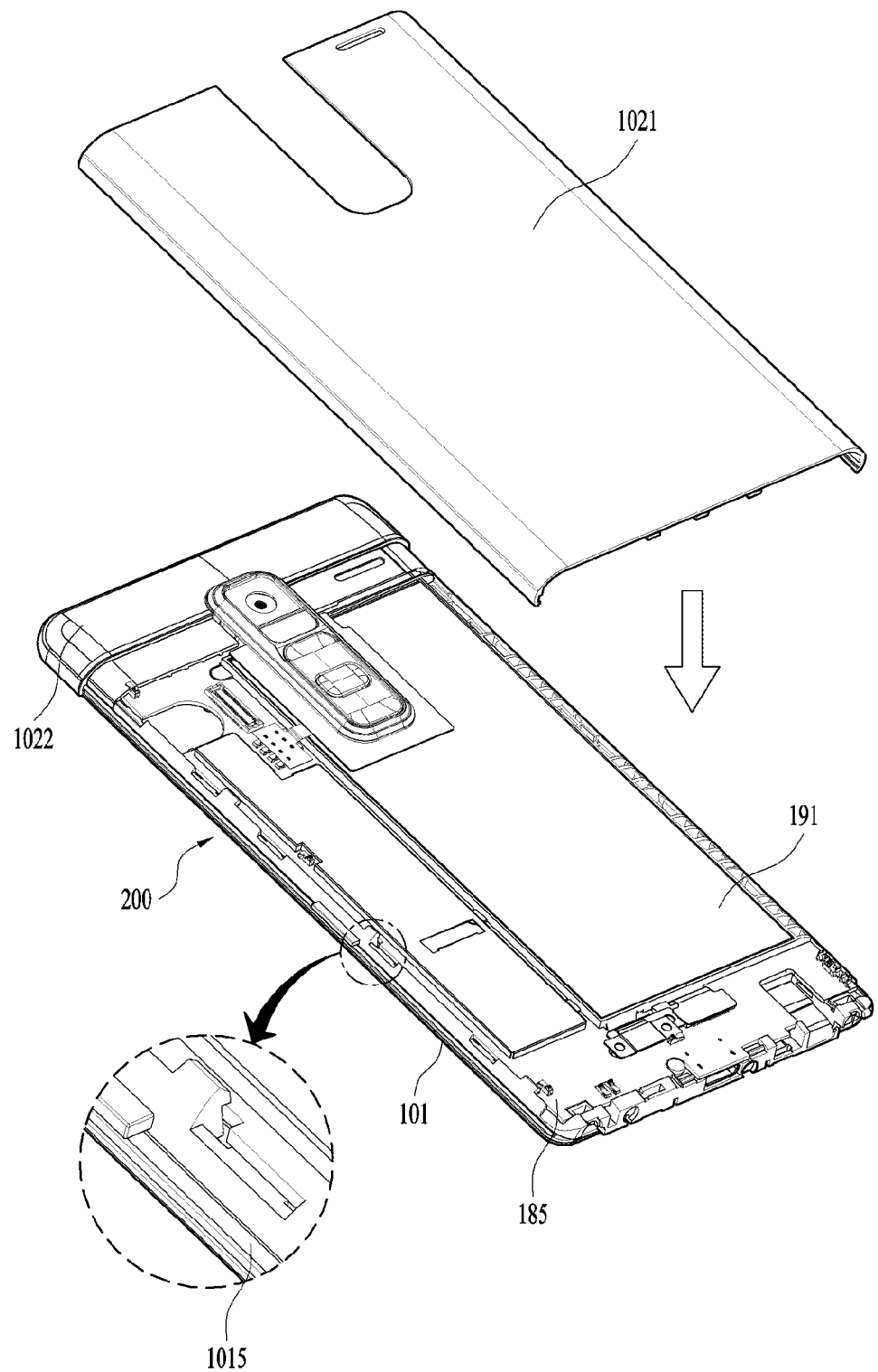
FIGS. 2 and 3 are diagrams illustrating a method for assembling the mobile terminal in accordance with the present disclosure.
Figure 3:
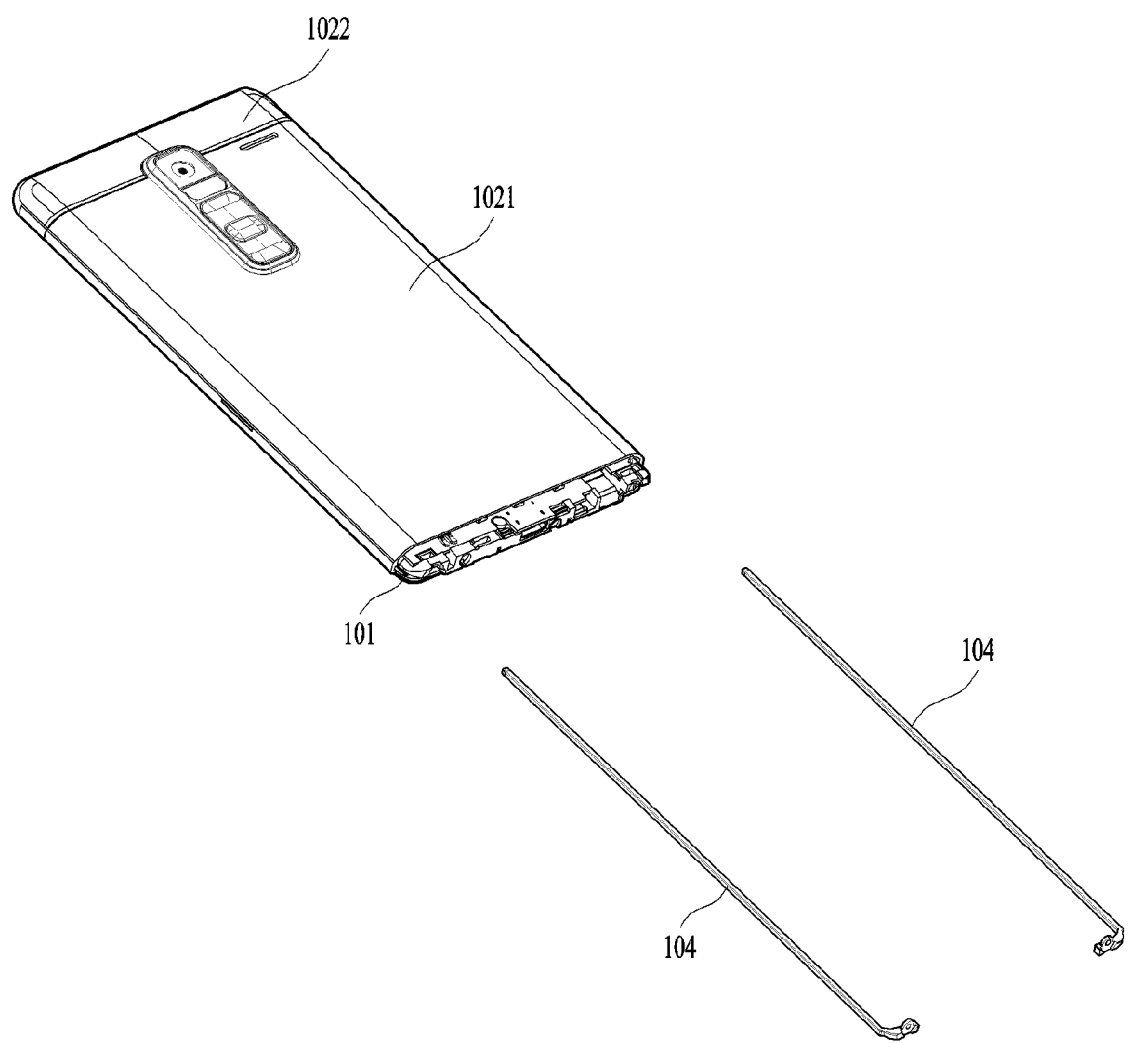

FIGS. 2 and 3 are diagrams illustrating a method for assembling the mobile terminal in accordance with the present disclosure. The second case 1022 is coupled to an upper portion of the mobile terminal and the first case 1021 is coupled to a rear portion of the body 200. After that, slide bars 104 is insertedly fitted between lateral surfaces of the first case 1021 and the first and the second lateral surfaces of the body 200, respectively. The slide bars 104 shown in FIG. 3 may be provided in both lateral surfaces of the first case 1021, respectively. In another embodiment which will be described later, one slide bar may be provided only in one lateral surface of the first case 1021.

Figure 4:
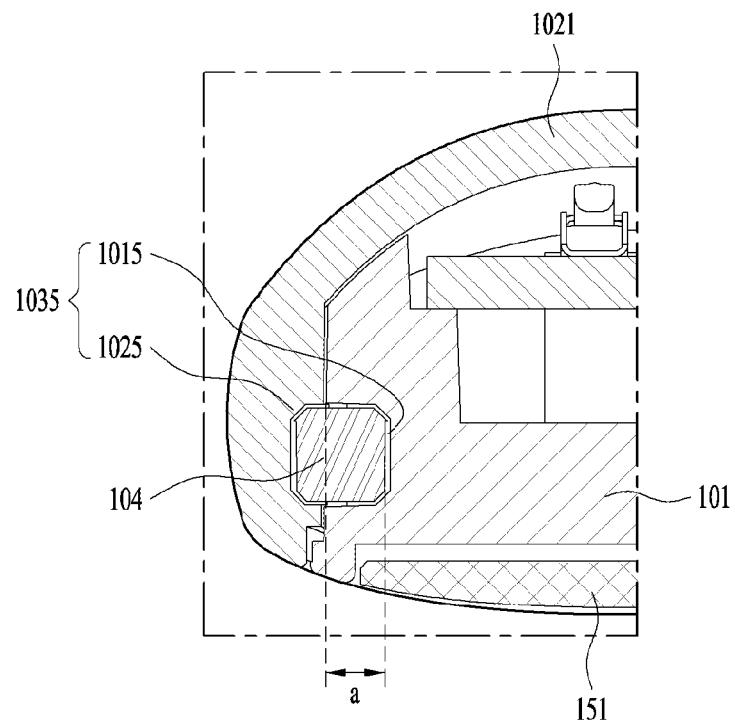
FIG. 4 is a diagram illustrating a slide bar provided in a second case of the mobile terminal in accordance with the present disclosure.

FIG. 4 is a sectional diagram along A-A of FIG. 1c. The slide bar 104 is provided between the first case 1021 and the first lateral surface (or the second lateral surface) of the body 200. A slide hole 1035 is formed by a first slide groove 1015 formed in a lateral surface of the second case 1022 and a second slide groove 1025 formed in a lateral surface of the first case 1021. The slide hole 1035 has a shape corresponding to a shape of the slide bar 104.

The slide bar 104 is not easily separated when formed in a shape having an angular cross section for the coupling force, compared with a shape having a circular cross section. Accordingly, the slide bar may have a rectangular cross section shown in FIG. 4 or an atypical cross section shown in FIG. 7. The slide bar 104 has to be pushed into the slide hole 1035 and the cross section has to be maintained longitudinally.

The slide bar 104 of the mobile terminal in accordance with the present disclosure may be fabricated larger than a conventional hook, so that it may facilitate the first case 1021 coupled to the body 200 by a stronger coupling force. The first case 1021 is coupled to the rear surface of the body 200 and the slide bar 104 is inserted along the longitudinal direction of the mobile terminal which is perpendicular to the direction in which the first case 1021 is coupled to the body 200. In other words, the direction in which the first case is coupled to the body is different from the direction in which the slide bar is coupled. Accordingly, the slide bar and the first case are coupled easily and not decoupled easily.

As shown in FIG. 4, an inner surface of the first case 1021 forms a plane, with no portion projected to the body 200, so that the first case 1021 may form no portion hooked or caught when coupled to the rear surface of the body 200. The inner surface of the first case shown in FIG. 4 may have the portion which is parallel to the direction in which the first case 1021 is coupled (the rear surface→the front surface) or the inclined surface which is getting wider outwardly along the direction to the front surface. In case of having the reversely inclination, a stronger force has to be applied to couple the first case 1021 or the coupling process of the first case 1021 cannot be performed.

Figure 5:
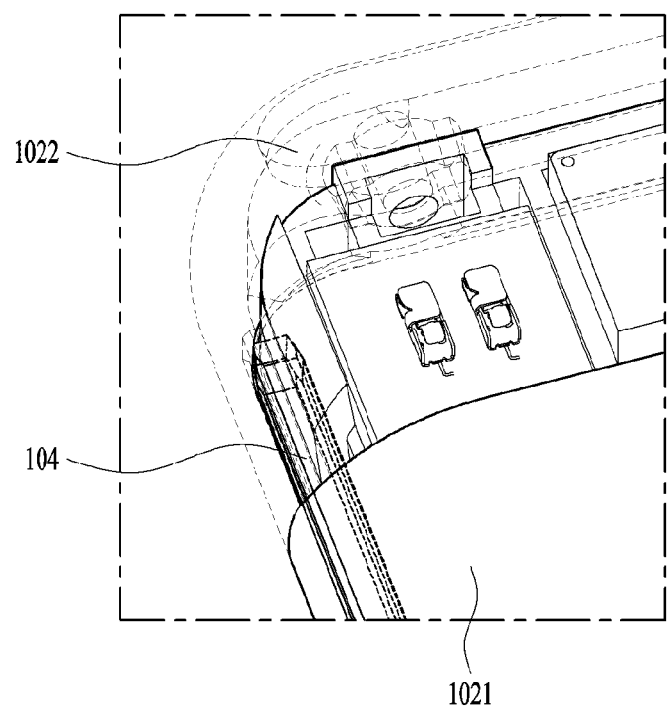
FIG. 5 is a sectional diagram along A-A shown in FIG. 1c.

FIG. 5 is a diagram illustrating the slide bar 104 provided in the second case 1022 of the mobile terminal in accordance with the present disclosure. The slide bar 104 is more extended from the first case 1021 to the second case 1022. Accordingly, the coupling force between the first case 1021 formed of the two pieces or the two different materials and the second case 1022 may be enhanced. The slide bar 104 extended from the first case 1021 to the second case 1022 may enhance the coupling force between the first case 1021 and the second case 1022, so that the first and second cases 1021 and 1022 can be coupled to the body 200 as one body.

Figure 6:
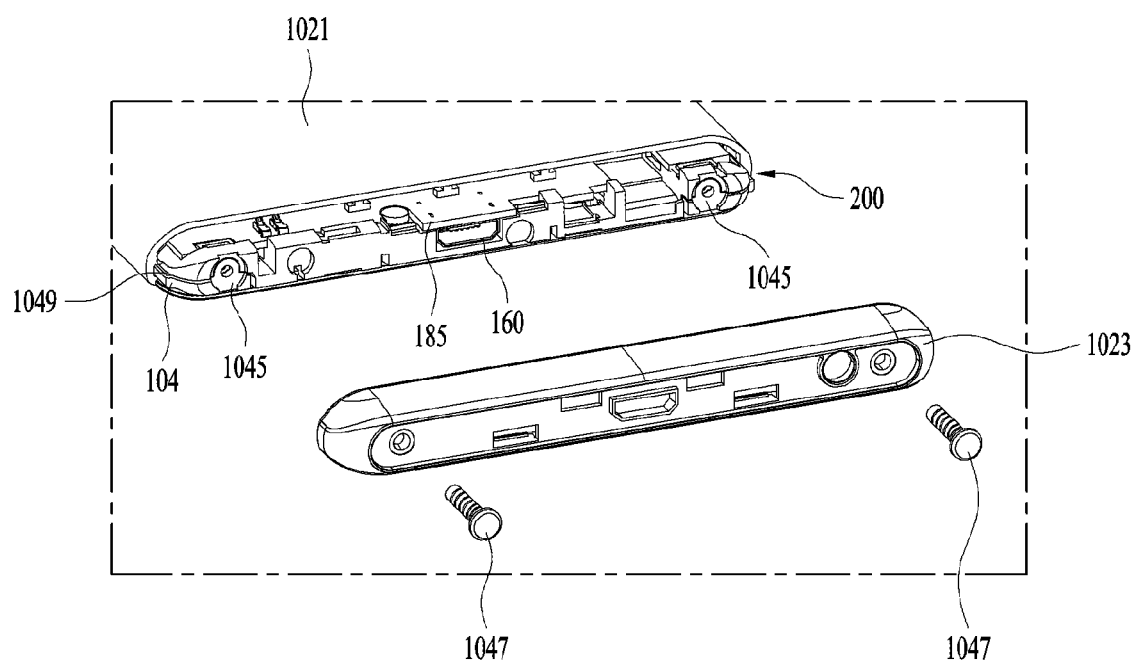
FIG. 6 is diagram illustrating a method for coupling a third case of the mobile terminal in accordance with the present disclosure.

FIG. 6 is a diagram illustrating a method for coupling the first case of the mobile terminal in accordance with the present disclosure. The slide bar 104 may further include a groove 1049 exposed, not overlapped with the first case 1021. The user may hook in the hook 1049 by the fingernail to separate the slide bar 104 from the slide hole 1035.

The slide bar 104 may include a fastening portion 1045 extended to the fourth lateral surface and longer than the slide hole 1035 as shown in FIG. 6. When the fastening portion 1045 of the slide bar 104 of the slide bar 104 is fastened to the body 200 by a screw 1047, the slide bar 104 is secured to the slide hole 1035.

After the first case 1021 and the second case 1022 are coupled to the body 200, using the slide bar 104, the third case covering the fourth lateral surface may be coupled to the body 200. A hook may be used in coupling the third case. For a stronger coupling force, the screw 1047 may be fastened to the body 200, penetrating the third case and the fastening portion 1045.

The screw 1047 is exposed to one side but the exposed portion is provided in a lateral surface of the lower or upper portion in which the interface unit 160, the ear jack and the speaker are arranged, only to minimize the effect of the exposed portion of the screw on the exterior design of the mobile terminal. In addition, when the screw 1047 is fastened via the fastening portion 1045 only in one portion of the mobile terminal, the exposition portion of the screw 1047 may be minimized and the third case may be coupled fixedly and strongly. Accordingly, the entire rigidity and strength of the mobile terminal may be improved.

The third case 1023 is formed of a non-conductive material and an antenna pattern is mounted in an inner surface of the third case 1023. When the third case 1023 is coupled to the body 200 to electrically connect the antenna pattern to the main board 185, a terminal mounted in the main board 185 may be connected to the antenna pattern of the third case 1023.

Figure 7:
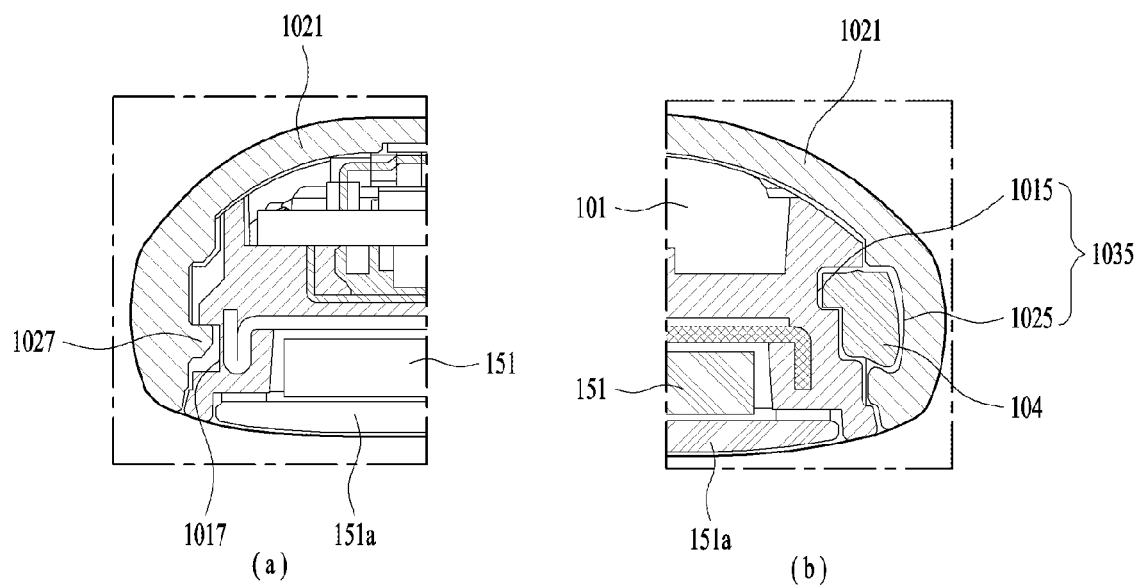
FIG. 7 is a sectional diagram illustrating another example of the mobile terminal in accordance with the present disclosure.
Figure 8:
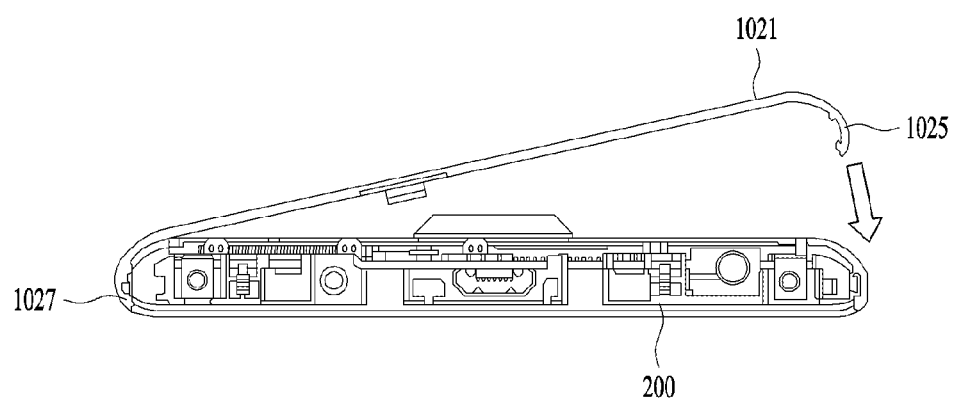
FIG. 8 is a diagram illustrating a method for assembling the mobile terminal of FIG. 7.

FIG. 7 is a sectional diagram illustrating another example of the mobile terminal in accordance with the present disclosure. FIG. 8 is a diagram illustrating a method for assembling the mobile terminal of FIG. 7. Referring to FIG. 7, the mobile terminal in accordance with the present disclosure may include the slide bar 104 provided only in the second lateral surface of the first case 1021 and a hook 1027 provided in the first lateral surface. as shown in FIG. 8, the hook 1027 is hooked to a hook groove 1017 formed in the first lateral surface of the body 200 and the second lateral surface of the body 200 is securely in contact with the second lateral surface of the first case 1021 in a direction to the rear surface of the body 200.

The number of the slide bars 104 is reduced and both the manufacturing costs and the number of the manufacturing processes are reduced advantageously in this embodiment of the mobile terminal. In addition, the larger sized hook 1027 may be secured in the structure of this embodiment and the stronger coupling force may be provided than the coupling force generated by the structure using only the hook in the conventional method for inducing the deformation of the rear case 102 applied the force to in the direction to the rear surface.

Figure 9:
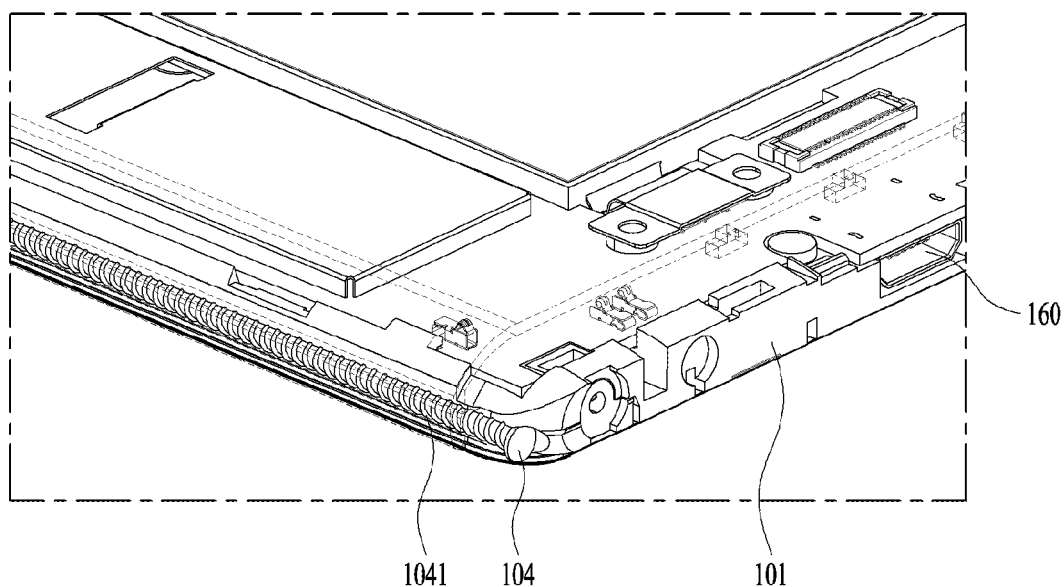
FIGS. 9 and 10 are diagram illustrating one example of the slide bar provided in the mobile terminal in accordance with the present disclosure.
Figure 10:
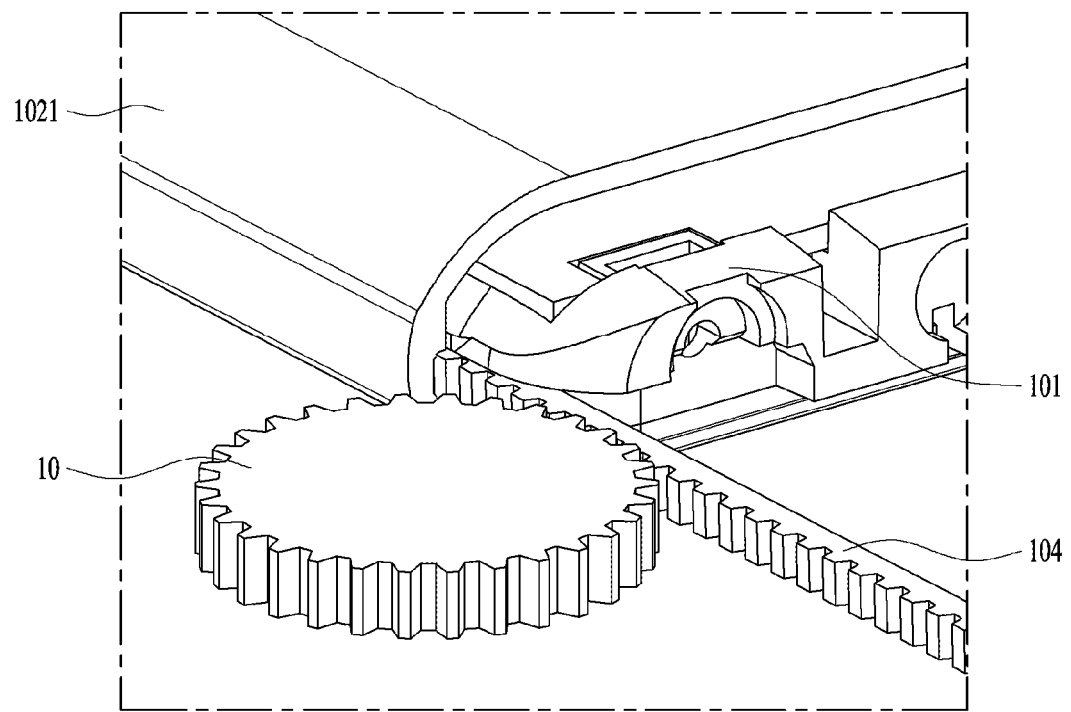

FIGS. 9 and 10 are diagram illustrating one example of the slide bar 104 provided in the mobile terminal in accordance with the present disclosure. In the embodiment of FIGS. 9 and 10, examples of the slide bar 104 are shown to provide a method for coupling the slide bar 104 to the slide hole 1035 easily.

In the embodiment shown in FIG. 9, a spiral groove is formed in the slide hole 1035 and a screw thread 1041 corresponding to the spiral groove is formed in an outer surface of the slide bar 104.

In this embodiment, the slide bar 104 itself is formed like a screw. Without using the screw 1047, the slide bar 104 may be secured stably enough not to slip out. The screw thread 1041 may be formed in an overall outer portion of the slide bar 104 or a predetermined outer portion of the slide bar 104. For example, when the screw thread 1041 is formed only in an end of the inserted portion of the slide bar, the rotation number of the slide bar may be reduced and the coupling process may be facilitated.

In the embodiment shown in FIG. 10, saw-teeth may be further provided and the saw-teeth may be formed in a longitudinal direction of the slide bar 104 in succession. The slide bar 104 may be retractable, using the rotation force of a pinion gear 10 engaging with the saw-teeth. Using the principle of the rack pinion gear 10, the mobile terminal having first case 1021 and the body 200 coupled to each other is put in a jig having the pinion gear 10, so as to arrange the saw-teeth of the slide bar 104 to engage with saw-teeth of the pinion gear 10. Once the pinion gear 10 is rotated, the slide bar 104 is inserted in the slide hole 1035 while linearly moving like a rack gear.

As mentioned above, effects of the mobile terminal and the method for controlling the same in accordance with the present disclosure are as follows.

According to at least one of the embodiments mentioned above, the coupling structure more stable than the conventional hook structure may be provided and it may be easy to assemble and dissemble the mobile terminal.

What is claimed is:

1. A mobile terminal comprising:
a body having a side surface and a rear surface;
a case attached to the body and covering at least a portion of the side and the rear surface of the body;
a first slide groove formed in the side surface facing the case;
a second slide groove formed in an inner surface of the case facing the side surface of the body; and
a slide bar inserted in a slide opening formed by the first and second slide grooves.

2. The mobile terminal of claim 1, wherein the slide bar is fixedly engaged with the slide opening.

3. The mobile terminal of claim 1,
wherein the slide opening is provided with an internal spiral groove and the slide bar is provided with a screw thread that corresponds to the pitch of the spiral groove, and
wherein the slide bar is inserted in the slide opening or drawn out of the slide opening by a rotation force when the slide bar rotates.

4. The mobile terminal of claim 1,
wherein the slide bar is provided with saw-teeth formed in a longitudinal direction of the slide bar to engage with a pinion gear,
wherein the slide bar is retractable from the slide opening by a rotation force when the pinon gear rotates.

5. The mobile terminal of claim 1, wherein the slide bar has one end provided outside of the slide opening and a groove is formed in a portion of the end of the slide bar that is outside of the slide opening.

6. The mobile terminal of claim 1, wherein the side surface comprises a first side surface and a second side surface, the second side surface provided at an opposite side of the first side surface, and wherein the first slide groove is formed in at least one of the first and second side surfaces.

7. The mobile terminal of claim 6, wherein the first side surface of the body is provided with a hook groove,
wherein the case is provided with a hook projected from the inside surface that is attachable to the hook groove, and
wherein the second side surface of the body is provided with the slide groove.

8. The mobile terminal of claim 6 further comprising:
a second case covering at least a portion of a third side surface of the body provided adjacent to the first or second side surface of the body and a predetermined portion of the body,
wherein a third slide groove is provided at an inner surface of the second case such that the slide opening extends through at least a portion of the second case.

9. The mobile terminal of claim 6, wherein the slide bar comprises a bend portion that extends along a fourth side surface of the body provided adjacent to the first or second side surface of the body.

10. The mobile terminal of claim 6, further comprising:
a third case covering at least a portion of a fourth side surface of the body provided adjacent to the first or second side surface of the body.

11. The mobile terminal of claim 10, wherein the third case is formed of a polymer material and comprises an antenna pattern provided at an inner surface to contact a connection terminal provided in the body.

12. The mobile terminal of claim 1, wherein the slide bar comprises a POM (Poly Oxy Methylene) material.

13. The mobile terminal of claim 1, wherein the case comprises a metallic material.

14. A mobile terminal comprising:
a body having a first side surface, a second side surface provided at an opposite side of the body as the first side surface, and a rear surface;
a case attachable to the body and covering the first side surface, the second side surface, and the rear surface of the body;
a hook groove formed in the first side surface of the body;
a hook projected from an inside surface of the case and releasably attached to the hook groove;
a first slide groove formed in the second side surface of the body;
a second slide groove formed in an inside surface of the case; and
a slide bar provided in a slide opening formed by the first slide groove and the second slide groove.

15. The mobile terminal of claim 14, wherein the slide bar is fixedly engaged with the slide opening.

16. A mobile terminal comprising:
a body having a right side surface, a left side surface, a top side surface, and a bottom side surface;

a first case attachable to the body and covering the right and left side surfaces of the body;

a second case attachable to the body and covering the top side surface of the body;

a hook groove formed in one of the right and left side surfaces of the body;

a hook projected from an inside surface of the first case and releasably attached with the hook groove;

a first slide groove formed in the other of the right and left side surfaces of the body;

a second slide groove formed in an inside surface of the first case; and a slide bar provided in a slide opening formed by the first slide groove and the second slide groove, wherein the slide bar is fixedly engaged with the slide opening.

17. The mobile terminal of claim 16, wherein a third slide groove is provided at an inner surface of the second case such that the slide opening extends through at least a portion of the second case.

* * * * *